United States Patent [19]

Hwang

[11] Patent Number: 4,922,554

[45] Date of Patent: May 8, 1990

[54] RETAINER FOR FLEXIBLE DRAIN PIPES

[76] Inventor: Jin-Chyuan Hwang, No. 118-209, Tai-Tzu Miao, Tai-Tzu Village, Jern-Der District, Tainan Hsien, Taiwan

[21] Appl. No.: 245,729

[22] Filed: Sep. 19, 1988

[51] Int. Cl.⁵ ............................................. F03C 1/284
[52] U.S. Cl. ........................................... 4/191; 4/197; 4/DIG. 13; 4/DIG. 16; 137/247.49; 248/68.1
[58] Field of Search .................. 4/191, 206, 207, 197, 4/DIG. 13, DIG. 16; 138/106, 107, DIG. 8; 248/49, 56, 68.1, 67.7; 137/247.49, 247.45, 247.41

[56] References Cited

U.S. PATENT DOCUMENTS

| | | | |
|---|---|---|---|
| 3,397,431 | 8/1968 | Walker | 248/68.1 |
| 3,682,422 | 8/1972 | Evans | 248/68.1 |
| 3,860,978 | 1/1975 | Wirth | 4/207 |
| 4,151,864 | 5/1979 | Thurman | 138/106 |
| 4,514,103 | 4/1985 | Wise et al. | 138/106 |

Primary Examiner—Henry J. Recla
Assistant Examiner—Edward C. Donovan
Attorney, Agent, or Firm—Bacon & Thomas

[57] ABSTRACT

An elongate plate having prealigned holes for guiding a flexible conduit in both the horizontal and vertical directions in order to form a flexible drain trap for permanently retaining a proper quantity of water therein to prevent an intrusion by insects.

2 Claims, 4 Drawing Sheets

RETAINER FOR FLEXIBLE DRAIN PIPES

BACKGROUND OF THE INVENTION

1. Field Of The Invention

This invention relates to retainers for flexible pipes and the like, particularly to retainers for flexible water drain pipes.

2. Prior Art

Generally, building drains, such as the water drain pipes of a rinsing sink, basin and bath tub need a return bend for permanently retaining a proper quantity of water therein to prevent the intrusions by unexpected insects such as cockroaches ants, bedbugs and the like.

It is well known that flexible pipes such as rubber pipes and plastic pipes are economical to manufacture and are easy to install for water drainage. Yet the flexibility of said pipes make it difficult for them to assume a desired installation shape.

SUMMARY OF THE INVENTION

Accordingly, it is an object of the present invention to provide retainers for flexible drain pipes which will overcome the disadvantages noted heretofore.

DETAILED DESCRIPTION OF THE PREFERRED EMBODIMENTS

The following is a detailed description of the best mode presently contemplated for several prefrred embodiments of the invention. This description is not to be taken in a limiting sense, but is made merely for the purpose of illustrating the general principles of the invention.

Figure 1:
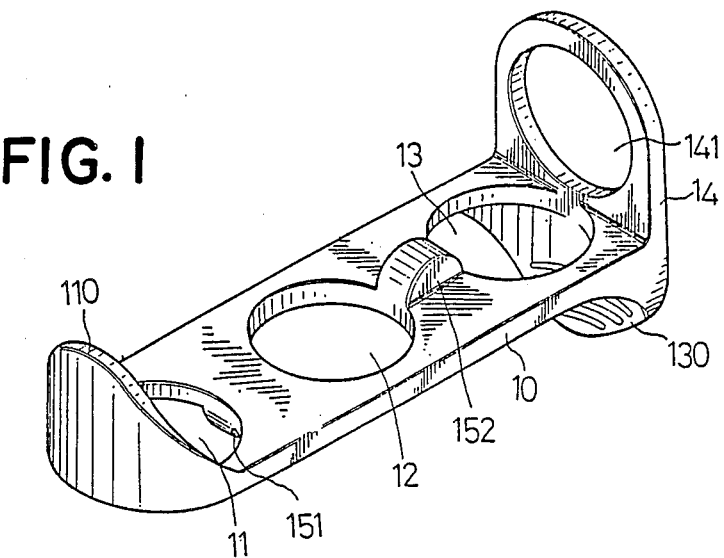
FIG. 1 is a perspective view of a retainer according to a first embodiment of the present invention.
Figure 2:
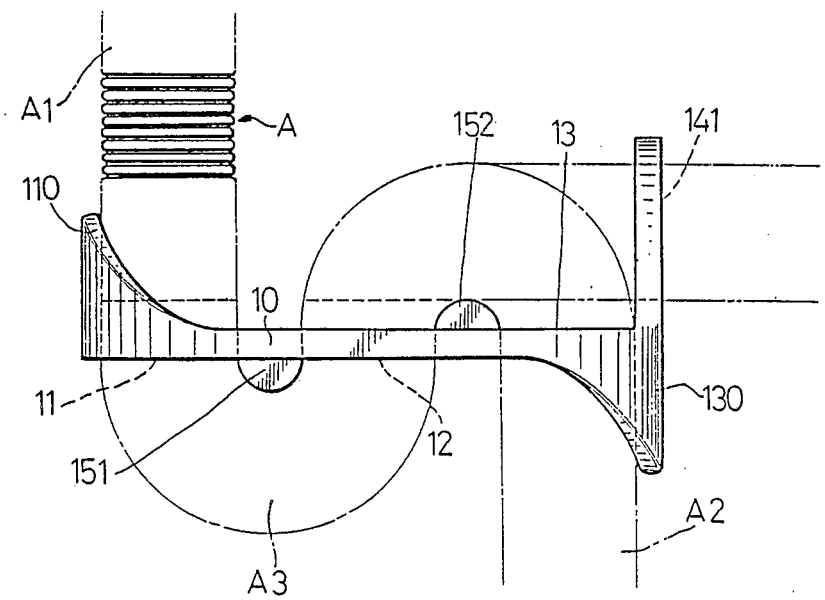
FIG. 2 is a schematic elevation view of the retainer shown in FIG. 1.

Referring to FIGS. 1 and 2, a retainer for a flexible drain pipe according to the present invention comprises a plate 10 with three openings 11, 12 and 13 separately and evenly located therein, a first guide body 151 integrally provided under the plate 10 between the inlet opening 11 and the second opening 12, a second guide body 152 integrally provided on the plate 10 between the second opening 12 and the outlet opening 13, a pair of partially circular integral sidewalls 110, 130, for guiding and stabilizng a flexible pipe, and are diagonally disposed on the plate 10 and extend upwardly from the correspondent periphery of the first opening 11 and downwardly from the correspondent periphery of the third opening 13, respectively, and an upstanding integral side wall 14 with an opening 141 formed therein disposed opposite sidewall 110 and next to the outlet opening 13 of the plate 10.

In operation, a flexible pipe such as a corrugated plastic pipe A (shown in phantom line in FIG. 2) can be inserted downwards through the first opening 11 and sequentially inserted upwards into the second opening 12 wherein the plastic pipe A is positioned around the peripheral surface of the guide body 151, so as to form a moderate return bend A3 under the plate 10 for permanently retaining a proper quantity of water which isolates the inlet end A1 of the drain pipe A from the outlet end A2 to prevent intrusion by insects.

The flexible pipe A can further be inserted either into the outlet opening 13 or the 90-degree opening 141 to be formed into the shape of a "U" or "sideward S" around the guide bodies 151, 152.

Figure 3:
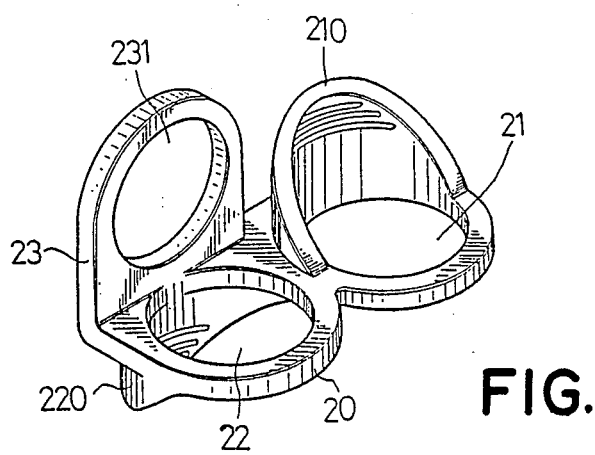
FIG. 3 is a perspective view of another embodiment of retainer according to the present invention.
Figure 4:
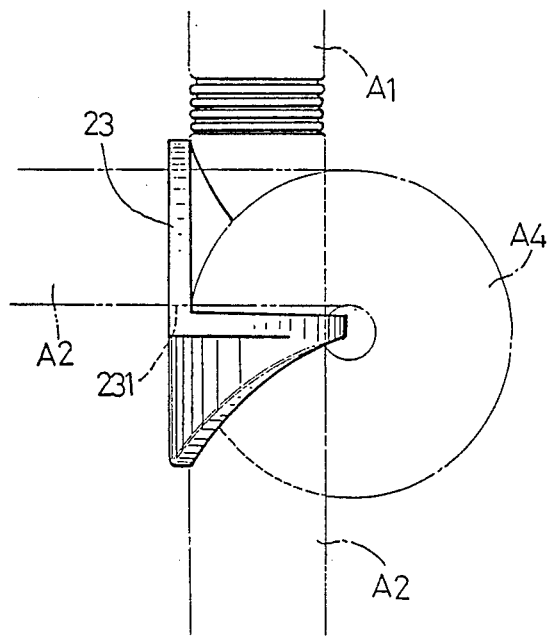
FIG. 4 is a side elevation view of the retainer shown in FIG. 3.

Referring to FIGS. 3 and 4, this is an embodiment of a simplified retainer according to the present invention which comprises a plate 20 with spaced inlet and outlet openings 21, 22, a pair of integral partially circular sidewalls 210, 220 provided at the same side of the plate 20 for guiding and stabilizing a flexible pipe and, respectively, extend upwards from the correspondent periphery of the inlet opening 21 and downwards from the correspondent periphery of the outlet opening 22, and an upstanding sidewall 23 with a 90-degree outlet opening 231 formed therein is integrally provided on the plate 20 next to the second opening 22 at the same side as the partially circular sidewall 220 is located.

In operation, a flexible drain pipe A (shown in phantom line in FIG. 4) can be inserted downwards through the first opening 21 and pulled upwards to be further inserted either downward through the outlet opening 22 or horizontally through the 90-degree outlet opening 231 thus forming the drain pipe A into a shape of a partial round or a complete round of a spiral for permanently retaining a proper quantity of water which will isolate the inlet end A1 of the drain pipe A from the outlet end A2.

Figure 5:
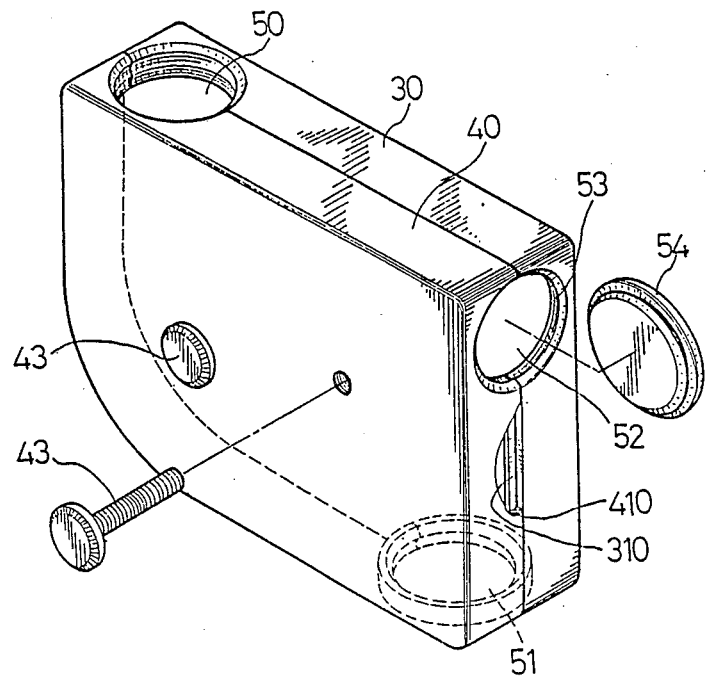
FIG. 5 is a perspective view of still another embodiment of a retainer according to the present invention.
Figure 6:
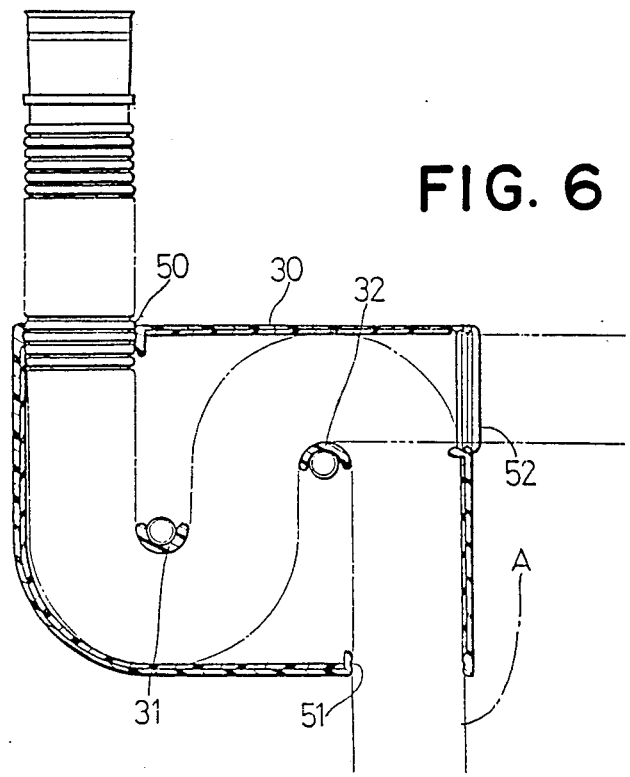
FIG. 6 is a sectional view of the retainer shown in FIG. 5.

The casing of the preferred embodiment shown in FIGS. 5 and 6 consists of two matching halves 30, 40 wedged together on a vertical plane through mating lips 310 and recesses 410 around the periphery of the contacting edges of the halves 30, 40 and is of such construction that when the two halves 30, 40 are properly aligned and closed, the casing will form on three of its mating walls three complete and inner threaded openings 50, 51, 52, an inlet opening 50 formed in one end of the top surface. A 90-degree outlet opening 52 is formed in the upper portion of the vertical sidewall away from the inlet opening 50, and a downward outlet opening 51 is formed in the far end of the bottom surface diagonally away from the inlet opening 50. Furthermore, one of the two halves 30, 40 of the casing has on its inside surface two integrally formed semi-circular guide plates 31, 32 protruding horizontally into the cavity of the casing, said guide plates 31, 32 being positioned at such different distances from the top and side walls of the casing where the inlet and 90-degree outlet openings 50, 52 are located that the guide plate 31 close to the inlet opening 50 but farther from the 90-degree outlet is at a lower elevation to the other guide plate 32 and has its convex surface pointing downward, while the guide plate 32 farther from the inlet opening 50 but close to the 90-degree outlet is at a higher elevation and has its convex surface pointing upward.

The relative dimensions of the casing and locations of the openings 50, 51, 52 and guide plates 31, 32 are such that depending on whether the outlet piping is intended to be 90-degree to or uni-directional with respect to the inlet piping, a flexible drain pipe can be fitted inside the casing and formed into the shape of a "U" or "sideward S" around the guide plates 31, 32 with its respective ends connected to the inlet opening 50 and the appropriate outlet opening 51 or 52 of the casing. The convex surfaces of the semi-circular guide plates roughly conform to the radii of the adjoining flexible piping.

The two halves 30, 40 of the casing may further be secured in their aligned and mating position by set screws 43 going through corresponding threaded openings in the two opposing vertical walls of the two halves perpendicular to the guide plates 31, 32, said set screws 43 passing underneath the concave surfaces of the respective semi-circular guide plates such that the guide plates can act both as guiding supports to the set screws 43 as well as protecting shields to the flexible piping A, allowing the casing to be easily assembled without any risk for the set screws interfering with or damaging the flexible piping during the assembly.

The unused outlet opening 51 or 52 can be closed with a threaded cap 54.

This embodiment performs similar functions of the embodiment shown in FIGS. 1 and 2 to prevent the inlet end by the drain pipe from intrusion of insects.

Figure 7:
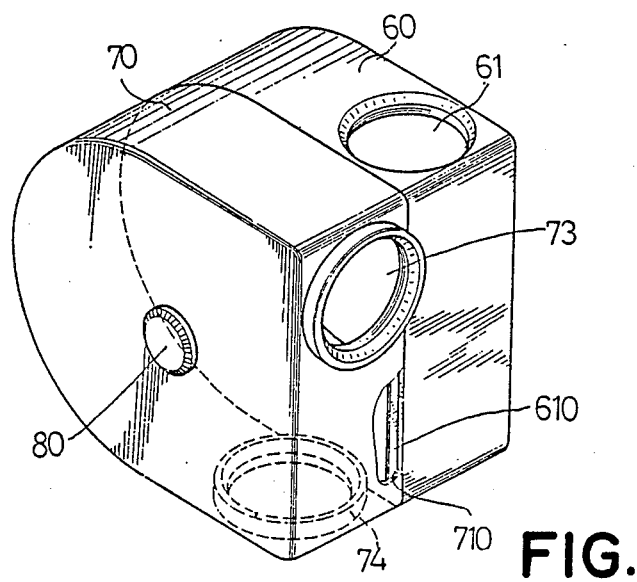
FIG. 7 is a perspective view of a further embodiment of a retainer according to the present invention.
Figure 8:
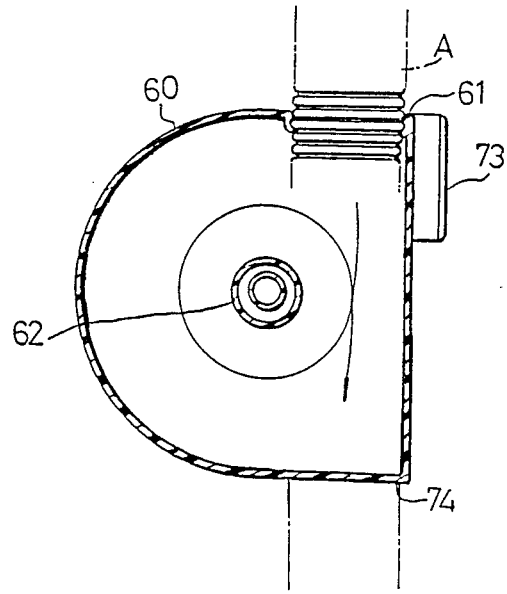
FIG. 8 is a sectional view of the retainer shown in FIG. 7.

Referring to FIGS. 7 and 8, the casing of a further preferred embodiment also consists of two matching halves 60, 70 with vertical sidewalls and opposite semi-circular sidewalls and wedged together on a vertical plane through mating lips 610 and recesses 710 around the periphery of the contacting edges of the halves 60, 70. An inlet opening 61 is formed in one end close to the vertical sidewall of the top surface of the one matching half 60, a 90-degree outlet opening 73 is formed in the upper portion of the vertical sidewall and a downward outlet opening 74 is formed in one end close to the vertical of the bottom surface of the other matching half 70. A circular guideplate 62, which is preferably concentric with the semi-circular sidewall, is integrally and horizontally protruded into the cavity of the casing.

The relative dimensions of the casing and locations of the openings 61, 73, 74 and guide plate 62 are such that depending on whether the piping is intended to be either 90-degree to or uni-directional with respect to the inlet piping, a flexible drain pipe A can be fitted inside the casing and formed into the shape of a partial round or complete round of a spiral around the guide plate 62 with its respective ends connected to the inlet opening 61 and the appropriate outlet opening 73 or 74 of the casing.

The two halves 60, 70 of the casing can further be secured in their aligned and mating position by set screw 80 going through corresponding inner openings in the two opposing vertical walls of the halves 60, 70 perpendicular to the guide plate 62. One of the said inner threaded opening is preferably located concentrically in the guide plate 62 such that the guide plate can act both as a guiding support for the set screw and as a protecting shield for the flexible pipe A. This permits the casing to be easily assembled without any risk to the flexible piping during the assembly.

The unused outlet opening 73 or 74 can also be closed with a cap.

This embodiment functions in a manner similar to the embodiment shown in FIGS. 3 and 4 to prevent the inlet end by the drain pipe from intrusions of insects.

While this invention has been described with what are presently considered to be the most practical and preferred embodiments, it is to be understood that the invention is not to be limited to the disclosed embodiments, but on the contrary, is intended to cover various modifications and equivalent arrangements included within the spirit and scope of the appended claims, which scope is to be accorded the broadest interpretation so as to encompass all such modifications and equivalent structures.

What is claimed is:

1. A retainer for holding a flexible drain pipe comprising:
   (a) an elongate plate having three aligned transverse openings adapted to receive a flexible drain pipe therethrough;
   (b) a pair of semicircular sidewalls adjacent the two outside holes of said prealigned openings, a first one extending downwardly, the second extending upwardly both sidewalls extending at an angle perpendicular to the plane of the elongate plate, the sidewalls being adapted to guide the flexible drain pipe in a vertical plane; and
   (c) a second upwardly extending sidewall on top of the downwardly extending one, at the opposite side of said first upwardly extending sidewall, said second upwardly extending sidewall having a fourth transverse hole therethrough adapted to receive and guide a flexible drain pipe in a horizontal direction.

2. The retainer of claim 1 further including:
   (a) a pair of guide bodies having a semicircular shape located on the elongate plate between the two outside aligned openings and the middle opening;
   (b) the guide body closest to the first upwardly extending sidewall extending downwardly;
   (c) the guide body closest to the downwardly extending sidewall extending upwardly; and
   (d) said guide bodies being adapted to guide a flexible drain pipe in an arcuate fashion through the said three aligned transverse openings in the elongate plate in order to form a drain trap.

* * * * *